United States Patent
Bacher et al.

(10) Patent No.: US 6,784,214 B1
(45) Date of Patent: Aug. 31, 2004

(54) METHOD AND DEVICE FOR RECYCLING PET MATERIALS

(76) Inventors: Helmut Bacher, Bruck/Hausleiten 17, St. Florian (AT), A-4490; Helmuth Schulz, Badstrasse 20, St. Florian (AT), A-4490; Georg Wendelin, Waldbothenweg 84, Linz (AT), A-4033

( * ) Notice: Subject to any disclaimer, the term of this patent is extended or adjusted under 35 U.S.C. 154(b) by 101 days.

(21) Appl. No.: 10/088,951
(22) PCT Filed: Sep. 22, 2000
(86) PCT No.: PCT/AT00/00255
§ 371 (c)(1), (2), (4) Date: Mar. 22, 2002
(87) PCT Pub. No.: WO01/21372
PCT Pub. Date: Mar. 29, 2001

(30) Foreign Application Priority Data

Sep. 22, 1999 (AT) .............................................. 1620/99

(51) Int. Cl.[7] .............................................. C08J 11/04
(52) U.S. Cl. ........................... 521/48; 528/503; 526/65
(58) Field of Search .............................. 521/48; 526/65; 528/503

(56) References Cited

FOREIGN PATENT DOCUMENTS

| | | |
|---|---|---|
| DD | 274436 A | 12/1989 |
| DE | 1957333 A | 12/1970 |
| EP | 0074346 A | 3/1983 |
| EP | 0379684 A | 8/1990 |
| EP | 0698462 A | 2/1996 |
| EP | 0779136 A | 6/1997 |
| WO | WO 9318902 A | 9/1993 |

*Primary Examiner*—Samuel A. Acquah
(74) *Attorney, Agent, or Firm*—Townsend and Townsend and Crew LLP

(57) ABSTRACT

Within a process for recycling of PET-material and/or objects of PET, the PET-material to be processed is heated and dried in the course of a pre-treatment step and simultaneously is crystallized at elevated temperature. This pre-treatment step is followed by a main-treatment step under vacuum. In this main-treatment step, the processed material is again dried and crystallized at a temperature that is higher than the temperature of the pre-treatment step. Preferably, also in the main-treatment step no plasticizing of the material takes place; the plasticizing or, respectively, melting of the material takes place only after the main-processing step.

An apparatus for performing this process comprises a pre-processing device (3) in which the processed material is dried and simultaneously crystallized at elevated temperature, and, if desired, is also comminuted. A main-processing device (4) is connected to this pre-processing device (3), in which main-processing device the supplied PET-material is dried, crystallized and heated to a temperature that is higher than the temperature within the pre-treatment device.

46 Claims, 2 Drawing Sheets

METHOD AND DEVICE FOR RECYCLING PET MATERIALS

BACKGROUND OF THE INVENTION

The invention relates to a process and an apparatus for recycling of PET-material.

Under PET-material (material of polyethylene terephthalate) all PET-materials and/or PET-objects are to be understood, also those of BOPET (bi-oriented PET), in particular pieces, milled bottle material, foils, fibers, flakes and the like.

When recycling articles of polyethylene terephthalate or of polyethylene terephthalate materials it is of importance that the PET-material to be recycled is as dry as possible in order to avoid a hydrolytic degradation of the molecule chains by the influence of hydrogen during plastifying or during the melting step. However, an efficient drying is possible only at elevated temperature at which the amorphous PET-particles or PET-parts adhere to each other. For these reasons, a crystallization of the PET-material should be obtained before drying. Such a crystallization can be obtained by uniformly moving or mechanically treating the particles at a temperature lower than the drying temperature, in any case at a temperature that is lower than the plastifying temperature.

However, since the PET-materials to be recycled or the articles consisting of PET, in particular PET-bottles, are mostly soiled and are washed and possibly previously comminuted, at which procedure a simultaneous soiling frequently cannot be avoided, in most cases the material is discretely comminuted or milled, washed and dried. Such a pre-drying should be at least so efficient that the moisture content does not exceed a value of 1.5 weight-% of the PET-material to be treated or to be recycled.

SUMMARY OF THE INVENTION

In particular, it is an object of the invention to provide for a process and an apparatus of the initially described kind by which PET-material is subjected to a quick recycling that is as power saving as possible, wherein the PET-granulate produced from the melt obtained, or PET-articles made therefrom, have high viscosity values, in particular a viscosity that can be compared with the viscosity values of the PET-material to be recycled. Further, the obtained melt or, respectively, the PET-granulate produced from the melt should meet the rules concerning food stuff techniques, which means that harmful substances or contaminations contained in the PET-material that is supplied to the recycling process are eliminated as far as possible by a suitable treatment.

This object is achieved within a process and the apparatus of the present invention.

Therefore, a two-step treatment of the delivered or supplied PET-material is made, wherein, when pre-treating in a pre-treatment apparatus, no plastification of the PET-material is made, however a crystallization and a certain pre-densification at a simultaneous drying takes place. The pre-densification is obtained by a suitable temperature by mechanical treatment of the PET-material or by power introduction into it. In particular, increasing or controlling of the temperature is made by the mechanical treatment of the PET-material or, respectively, by conversion of the rotational energy of at least one revolving mixing and/or comminuting element into thermic energy by reasons of the friction losses occurring.

During the main treatment in a main treatment apparatus, the PET-material is further dried and crystallized at an elevated temperature and is kept under a high vacuum for a certain mean dwell time. Again there is a mechanical treatment or material condensation and introduction of power by at least one revolving mixing and/or comminuting element that by its rotation introduces the corresponding thermic energy into the PET-material and further heats it.

The main treatment that is effected under vacuum reduces the remaining humidity to a predetermined defined mean value and also has the effect that volatile harmful substances are separated from the PET-material.

The temperature at the main treatment is kept below the melting temperature of the PET-material, in particular about 40 to 60° C. below the melting temperature. However it is desired to keep this temperature as high as possible.

Only after the main treatment, the PET-material conveyed off is plasticized by an extruder that preferably is directly connected to the main treatment apparatus. By the direct, vacuum-tight connection, the vacuum within the main treatment apparatus can act into the inlet section of the extruder. This extruder comprises a plasticizing zone followed by a compression and damming zone. This damming zone is followed by a degassing or evacuating zone in which volatile substances are sucked off from the melt by a vacuum, in particular by a high vacuum. Within this, a one-step or multi-step degassing can be provided. It is also possible to provide a plurality of compression zones and decompression zones having different values of the vacuum one after the other. Thereby also persistent contaminations or those which are difficult to vaporize can be vaporized off.

By a suitable selection of the temperatures and of the dwell times within the pre-treatment apparatus and within the main treatment apparatus, the viscosity value of the melt obtained from the extruder and of the PET-granulate produced from the melt can be adjusted. By suitably long dwell times and suitably high temperatures within the vacuum, a positive influence onto the viscosity is effected or, respectively, a re-polymerization takes place.

Advantageous embodiments of the invention can be seen from the following description and the drawing. In the drawing, two exemplary embodiments of the invention are shown.

DESCRIPTION OF THE PREFERRED EMBODIMENTS

Figure 1:
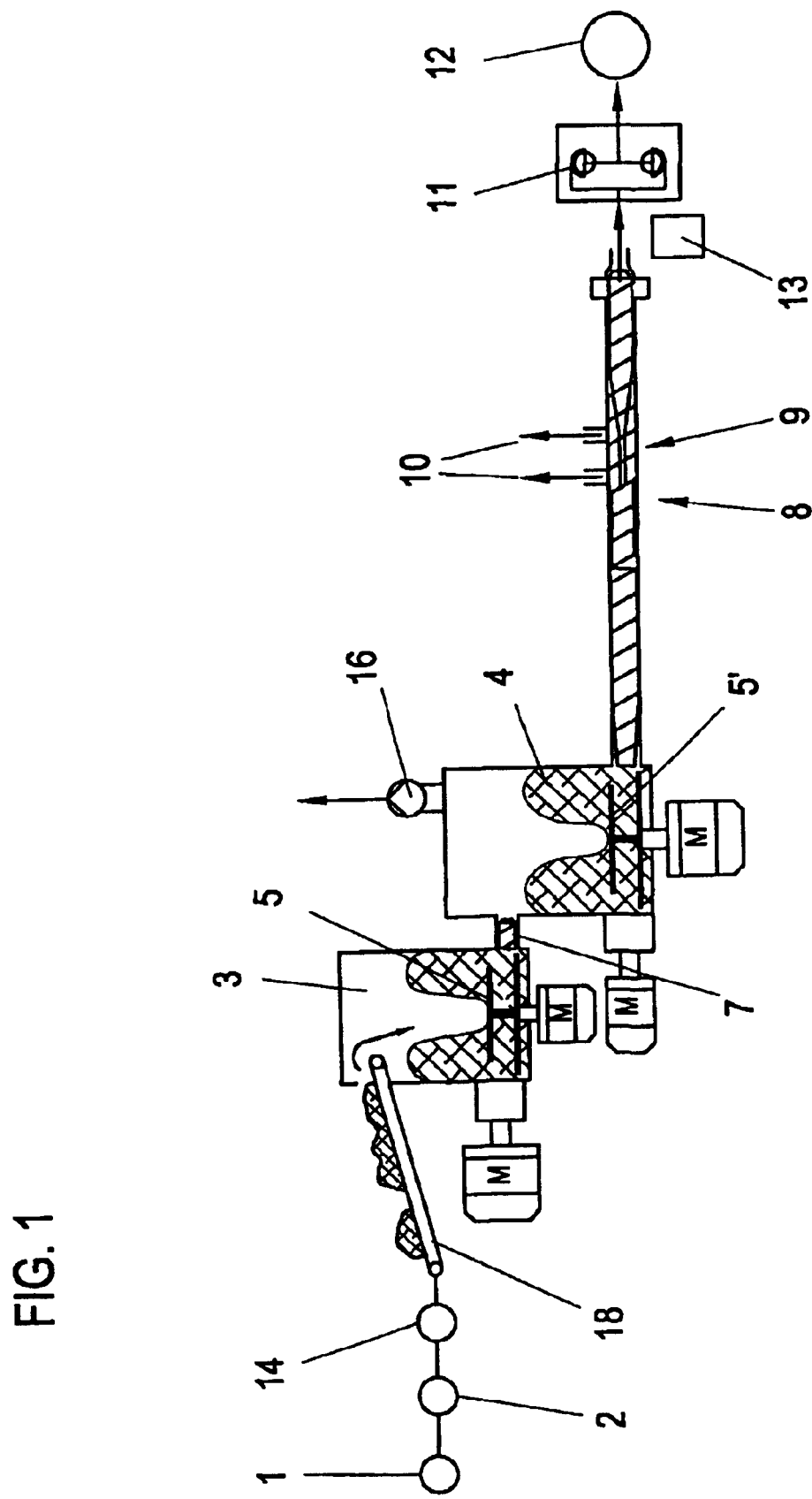
FIG. 1 shows an embodiment of the invention in which the PET-material is directly supplied from the pre-treatment apparatus to the main treatment apparatus.

PET to be recycled, in particular PET-material and/or objects of PET, can be comminuted within a comminuting unit 1 and can be supplied via a washing unit 2 to a unit 14 for pre-drying. Used PET-bottles and PET-containers to be recycled are in an advantageous manner pre-sorted and are pre-milled to an average size of about 15 to 25 mm. The residual humidity of this milled, washed and dried PET-material should be the least possible by reason of process technology and should amount to 1.5% by weight maximally.

For the pre-treatment, the PET-material is supplied to a pre-processing apparatus 3 for pre-drying, in which it can be also comminuted, if desired. Within the pre-processing apparatus 3 a heating and a crystallization of the material takes place simultaneously with drying. For this, within the pre-treatment apparatus 3 a rotating mixing and/or comminuting element 5 is provided that rotates with a circumferential speed of 9 to 15 m/s. Thereby it is ensured that the mechanical motor power is converted into heat by friction between the mixing tools and the PET-pieces or the PET-material. The throughput of the PET-material is so controlled that its average dwell-time amounts to about 35 to 65 min, preferably 40 to 60 min. Within this, the temperature of the PET-material is adjusted to about 140 to 190° C., preferably 150 to 160° C. At this temperature, the surface water evaporates immediately and due to the long dwell-time also a substantial portion of the absorbed humidity or other absorbed contamination escapes. It is not absolutely necessary, however it is of advantage if processing of the PET-material within the pre-processing apparatus 3 is made under vacuum. Thereby, the dwell-time of the PET-material within the pre-processing apparatus 3 can be decreased, or, respectively, the volume of this apparatus can be correspondingly reduced. Such processing in particular is then justified if the material to be processed should be highly protected against oxidation, or, respectively, if comminuting within the pre-processing unit 3 is not necessary.

Figure 2:
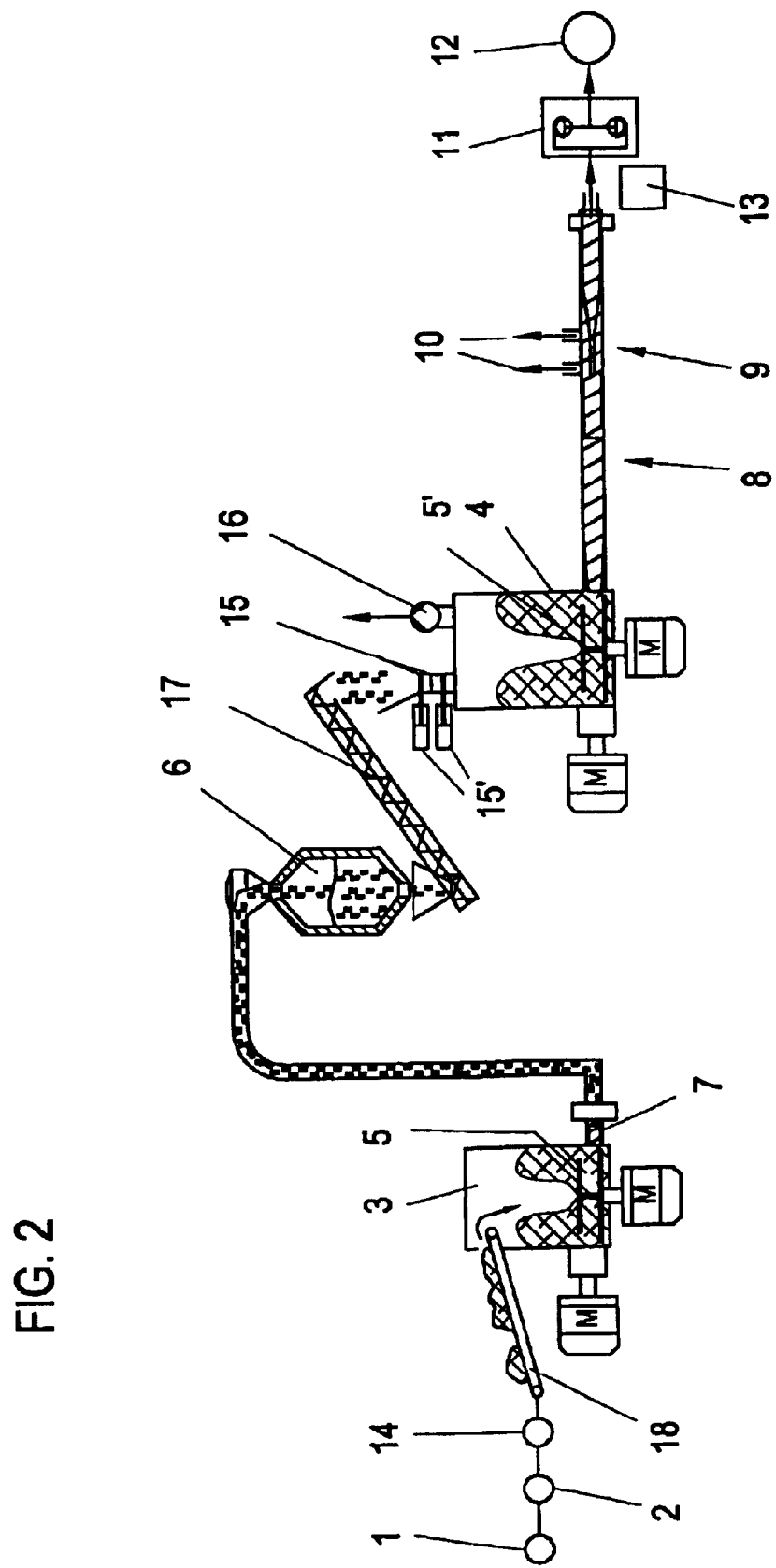
FIG. 2 shows an embodiment of the invention in which the PET-material is supplied from the pre-treatment apparatus to the main treatment apparatus via an intermediate storage means.

From the pre-treatment apparatus 3, to which the PET-material is supplied, preferably continuously, in particular by a supplying unit 18, for example a conveyor belt, the PET-material is conveyed off by a conveyor unit 7, in particular a conveyor screw. It can be conveyed directly (FIG. 1) or via an intermediate storage means 6 (FIG. 2) and via a further conveyor unit, for example a conveyor screw 17, to a main-processing apparatus 4.

Preferably, the main-processing apparatus 4 is supplied with heated PET-material.

The conveyor unit 7 is filled by the pre-processing apparatus 3 and is kept at a temperature of 140 to 170° C., in particular 150 to 160° C.

Within the main-processing apparatus 4, the particles of PET-material, which partially loosely adhere to each other, are mainly broken into pieces by a rotating mixing and/or comminuting element 5', and the temperature of the synthetic plastic material is increased to 170 to 210° C., in particular 180 to 210° C. The circumferential speed of the mixing and/or comminuting element 5' corresponds substantially to the circumferential speed of the mixing and/or comminuting element 5 within the pre-processing apparatus 3 and also amounts to about 9 to 15 m/s.

The volume of the receptacle of the main-processing device 4 and the throughput of the material are so chosen that an average dwell-time for the PET-material of 40 to 90 min, in particular 50 to 90 min, is obtained. The pressure within the main-processing apparatus 4 is adjusted to a value of less than 20 mbar, preferably, for obtaining best results, to less than 10 mbar.

Filling of the main-processing apparatus 4 can be made directly by means of the screw 7 or by means of a sluice device 15, which operates with two gas-tight or vacuum-tight slide gates 15' and thus introduces the PET-material in batch quantities. A vacuum pump 16 is connected to the main-processing apparatus 4.

An extruder 8 is connected to the main-processing apparatus 4 and further processes the PET-material delivered from the main-processing device 4. Within the extruder 8, the PET-material is plasticized or molten. The extruder 8 may comprise at least one degassing zone 9, whereby a vacuum pump 10 is connected to the degassing opening in the extruder housing in order to adjust a pressure of less than 10 mbar, in particular less than 5 mbar. By providing at least one degassing zone and, if desired, applying vacuum, the separation of humidity and/or other separation products can be influenced. Preferably, the extruder 8 comprises a double degassing zone.

It has been shown that if the above-mentioned processing parameters are observed, a viscosity value of the molten PET-material or of the PET-granulate could be obtained that was about 5% above the viscosity values of the supplied PET-material. This viscosity increase could be obtained in particular by the two-step processing as well as by the corresponding adjustment of temperature, dwell-times, vacuum pressures and number of vacuum zones or degassing zones. It has further been shown that besides the humidity other separation products could also be separated within the extruder by suitably adjusting temperature, pressure, dwell-times and shearing.

Within a preferred embodiment of the invention, the extruder 8 is connected gas-tightly to the main-processing apparatus 4 so that the vacuum of the main-processing apparatus 4 acts into the extruder inlet.

A screening or filtration device 11 may be connected to the extruder 8, and the melt passing through it is supplied to a device 12 for the production of PET-granulate. Between the extruder 8 and the filtration device 11 a device 13 for measuring the viscosity of the obtained melt can be disposed.

It is of advantage if the PET-material is conveyed from the pre-processing apparatus 3 to the main-processing apparatus 4 under exclusion of air in order to exclude that the pre-dried PET-material is moistened again.

In order to avoid that the vacuum applied to the extruder 8, in particular within the degassing zones, acts back to the main-processing apparatus 4, provisions are to be made that the compression within the extruder 8, or the tightening action of the material conveyed by the extruder, are so great that any reaction of the vacuum to the main-processing device 4 is avoided. The same holds for a reaction of the vacuum of the main-processing apparatus 4 to the pre-processing apparatus 3. In this case, however, a reaction can be excluded by providing the sluice with suitable sluice sliding gates 15'. If the pre-processing apparatus 3 is directly connected to the main-processing apparatus 4, the conveying screw must be vacuum-tight.

When supplying to the main-processing apparatus 4, the supplied PET-material is within the sluice that is predisposed with respect to the main-processing apparatus 4, which has already been subjected to the vacuum so that no substantial pressure decrease can take place within the main-processing apparatus 4. This is of advantage because the amount of the vacuum has a direct influence on the separation of the harmful substances and on the viscosity.

When an intermediate storage means 6 (FIG. 2) is used, an irregular supply of the pre-processing apparatus 3 can be tolerated.

Mostly it is sufficient to obtain the temperature increase of the supplied PET-material within the pre-processing device 3 and within the main-processing device 4 by the introduction of power by means of the rotating mixing and/or comminuting elements 5, 5'. In addition, the pre-processing device 3 and/or the main-processing device 4 may also be heated.

In the course of the pre-treatment and of the main treatment, the PET-material can also be comminuted. The mixing and/or comminuting elements have then to be correspondingly constructed.

The drive means for the mixing and/or comminuting elements 5, 5' or, respectively, for the conveyor means 7, 17 or, respectively, for the extruder 8 are not shown or have been designated by M, respectively.

What is claimed is:

1. Process for recycling of PET-material, in which the PET-material to be processed is heated by movement and thereby is dried, crystallized and at least one of plasticized and molten, and subsequently is processed to one of PET-granulate and PET-articles, characterized in that the supplied PET-material is processed in first and second steps, wherein in the first step the PET-material is subjected to a pre-processing by subjecting it to mechanical power and thereby heating it and drying it at an elevated temperature, and simultaneously crystallizing it, and that then within the second step that precedes plasticizing or melting, the PET-material is subjected to a main processing in which the PET-material under vacuum conditions is again dried and further crystallized by subjecting it to mechanical power, wherein the main processing is performed at a temperature that is increased when compared with the pre-processing.

2. Process according to claim 1, characterized in that the material to be processed is at least one of pre-comminuted, washed and pre-dried before the pre-processing step.

3. Process according to claim 1, characterized in that the temperature of the main-processing step is kept below the plasticizing temperature of the PET-material.

4. Process according to claim 1, characterized in that for PET-pieces and/or milled PET-bottles, the pre-processing step is performed under environmental pressure at a temperature range of 140 to 190° C. and at simultaneous mechanical treatment or, respectively, applying power that causes heating, by means of at least one mixing and/or comminuting element, wherein the average dwell-time of the PET-material or, respectively, the duration of pre-processing, amounts to 35 to 65 min.

5. Process according to claim 1, characterized in that for PET-foils and/or PET-fibers and/or PET-flakes, the pre-processing step is performed under environmental pressure at a temperature range of 170 to 200° C. and at simultaneous mechanical treatment or, respectively, applying power that causes heating, by means of at least one mixing and/or comminuting element, wherein the average dwell-time of the PET-material or, respectively, the duration of pre-processing, amounts to 10 to 30 min.

6. Process according to claim 1, characterized in that the PET-material is subjected to the pre-processing step in a continuous flow.

7. Process according to claim 1, characterized in that the pre-processed PET-material is subjected to an intermediate storage between the pre-processing step and the main-processing step, the duration of the storage corresponds to 80 to 120% of the duration of pre-processing step, and the pre-processed PET-material is kept during the intermediate storage and/or during conveying to main processing at a temperature that is between 130 to 190° C.

8. Process according to claim 1, characterized in that the main-processing step is performed under a pressure of less than 20 mbar, and the pre-processed PET-pieces and/or the milled bottle material is one of mechanically treated at a temperature of 170 to 210° C. and subjected to a power introduction that causes heating by at least one mixing and/or comminuting element, wherein the average dwell-time of the PET-material or the duration of the main-processing step, respectively, amounts to 40 to 100 min.

9. Process according to claim 8, characterized in that the main processing is performed at a pressure of less than 10 mbar.

10. Process according to claim 1, characterized in that the main-processing step is performed under vacuum, and the pre-processed PET-foils and/or PET-fibers are processed at one of a temperature of 160 to 210° C. and by subjecting them to a mechanical power introduction that causes heating by at least one mixing and/or comminuting element, wherein the average dwell-time of the PET-material or the duration of the main-processing step, respectively, amounts to 5 to 25 min.

11. Process according to claim 10, characterized in that the main-processing step is performed at a pressure less than 150 mbar.

12. Process according to claim 5, characterized in that at least one rotating mixing and/or comminuting element is used.

13. Process according to claim 1, characterized in that the PET-material is comminuted before pre-processing to sizes of 15 to 25 mm.

14. Process according to claim 1, characterized in that the PET-material to be processed is pre-comminuted and/or washed and/or pre-dried before the preprocessing step.

15. Process according to claim 1, characterized in that the PET-material is supplied from a main-processing apparatus to the extruder under vacuum conditions.

16. Process for recycling of PET-material, in which the PET-material to be processed is heated by movement and thereby is dried and thereafter is one of plasticized and molten, wherein the PET-material is initially processed in first and second steps, wherein in the first step the PET-material is pre-processed by subjecting it to mechanical power to thereby heat and dry it at an elevated temperature, and wherein thereafter in the second step the PET-material is subjected to a main processing in which the PET-material is dried under vacuum conditions by again subjecting it to mechanical power, wherein the PET-material in the first step is crystallized simultaneously with drying, and wherein the PET-material in the second step is further crystallized, the second step being performed at a temperature that is higher than the temperature during the first step, and wherein, after the PET-material has been one of plasticized and molten, it is processed into one of a PET-granulate and PET-articles.

17. Process according to claim 16, including at least one of pre-comminuting, washing and pre-drying the PET-material before pre-processing it.

18. Process according to claim 16, including keeping the temperature of the main processing below a plasticizing temperature of the PET-material.

19. Process according to claim 16, wherein the PET-material comprises at least one of PET-pieces and milled PET-bottles, and wherein the pre-processing is performed at a temperature range between 140 to 190° C. by at least one of a mechanical treatment and applying power that causes heating and employs at least one of a mixing element and a comminuting element, and wherein at least one of an average dwell-time of the PET-material and/or duration of the pre-processing amounts to 35 to 65 min.

20. Process according to claim 19, wherein the temperature range of pre-processing is between 150 to 160° C. and the duration of pre-processing is 40 to 60 min.

21. Process according to claim 16, wherein the PET-material comprises at least one of a PET-foil, PET-fibers and PET-flakes, wherein the pre-processing is performed at a temperature range of 170 to 200° C. by at least one of a mechanical treatment and applying power that causes heating and employing at least one of a mixing element and a comminuting element, and wherein at least one of an average dwell-time of the PET-material and duration of the pre-processing amounts to 10 to 30 min.

22. Process according to claim 21, wherein the temperature range for pre-processing is between 180 to 200° C. and the duration of the pre-processing amounts to 10 to 15 min.

23. Process according to claim 16, wherein the pre-processing is performed under a vacuum.

24. Process according to claim 19, wherein the pre-processing is performed under ambient pressure.

25. Process according to claim 16, including causing contaminants included in the PET-material to escape by using extended dwell-times during pre-processing.

26. Process according to claim 16, wherein pre-processing is performed by subjecting the PET-material to a continuous flow.

27. Process according to claim 16, including subjecting the pre-processed PET-material to an intermediate storage between the pre-processing and the main processing for a duration between 80 to 120% of the duration of pre-processing, and keeping the pre-processed PET-material during at least one of the intermediate storage and conveying it to the main processing at a temperature that is substantially constant.

28. Process according to claim 27, including keeping the temperature during the at least one of the intermediate storage and conveying it to the main processing between 130 to 190° C.

29. Process according to claim 28, wherein the temperature is kept between 150 to 170° C.

30. Process according to claim 16, including performing the main processing under vacuum, wherein the PET-material comprises at least one of pre-processed PET-pieces and milled bottle material and is one of mechanically treated at a temperature of between 170 to 210° C. and subjected to a power introduction that causes heating with at least one of a mixing element and a comminuting element, and wherein an average dwell-time of the PET-material or the duration of the main processing amounts to between 40 to 100 min.

31. Process according to claim 30, wherein the main processing is performed under a pressure of less than 20 mbar.

32. Process according to claim 30, wherein main processing is performed under a pressure of less than 10 mbar.

33. Process according to claim 30, wherein the mechanical treatment is performed at a temperature of between 180 to 200° C.

34. Process according to claim 30, wherein the duration of main processing is between 50 to 90 min.

35. Process according to claim 21, wherein the main processing is performed under a vacuum, wherein, during the main processing, the pre-processed at least one of PET-foils and PET-fibers are subjected to one of at a temperature between 160 to 210° C. and a mechanical power introduction that causes heating with at least one of a mixing element and a comminuting element, and wherein one of the average dwell-time of the PET-material and the duration of the main processing amounts to 5 to 25 min.

36. Process according to claim 35, wherein the pre-processed at least one of PET-foils and PET-fibers are main-processed at a temperature between 170 to 205° C.

37. Process according to claim 35, wherein the duration of the main processing amounts to between 10 to 15 min.

38. Process according to claim 35, wherein the main processing is performed at a pressure of less than 150 mbar.

39. Process according to claim 38, wherein the main processing is performed at a pressure of less than 50 mbar.

40. Process according to claim 16, wherein subjecting the PET-material to mechanical power comprises using at least one of a rotating mixing element and a rotating comminuting element.

41. Process according to claim 16, including at least one of pre-comminuting, washing and pre-drying the PET-material prior to pre-processing.

42. Process according to claim 41, including comminuting the PET-material prior to pre-processing to particle sizes between 15 to 25 mm.

43. Process according to claim 16, including supplying the PET-material from a main-processing apparatus to an extruder under a vacuum.

44. Process according to claim 43, wherein the vacuum exists within the main-processing apparatus and extends into an inlet section of the extruder.

45. Process according to claim 16, including filtering the PET-material after plasticizing or melting.

46. A process according to claim 1 including filtering the PET-material before it is processed to one of PET-granulate and PET-articles.

* * * * *